United States Patent
Baldreich et al.

(10) Patent No.: US 10,927,990 B2
(45) Date of Patent: Feb. 23, 2021

(54) CONNECTOR FOR CONNECTING CONDUITS FOR LIQUID OR GASEOUS MEDIA

(71) Applicant: Henn GmbH & Co KG., Dornbirn (AT)

(72) Inventors: Wolfgang Baldreich, Dornbirn (AT); Harald Hartmann, Dornbirn (AT)

(73) Assignee: Henn GmbH & Co KG., Dornbirn (AT)

( * ) Notice: Subject to any disclaimer, the term of this patent is extended or adjusted under 35 U.S.C. 154(b) by 178 days.

(21) Appl. No.: 15/766,502

(22) PCT Filed: Oct. 3, 2016

(86) PCT No.: PCT/EP2016/073540
§ 371 (c)(1),
(2) Date: Apr. 6, 2018

(87) PCT Pub. No.: WO2017/060184
PCT Pub. Date: Apr. 13, 2017

(65) Prior Publication Data
US 2018/0299050 A1    Oct. 18, 2018

(30) Foreign Application Priority Data
Oct. 7, 2015    (AT) .............................. A 50855/2015

(51) Int. Cl.
*F16L 37/088*    (2006.01)

(52) U.S. Cl.
CPC ....... *F16L 37/0885* (2019.08); *F16L 2201/10* (2013.01)

(58) Field of Classification Search
CPC .. F16L 37/088; F16L 37/0885; F16L 2201/10
(Continued)

(56) References Cited

U.S. PATENT DOCUMENTS

| 4,423,891 A | * | 1/1984 | Menges | |
| 5,273,323 A | * | 12/1993 | Calmettes | ........... F16L 37/0885 |
| | | | | 285/321 |

(Continued)

FOREIGN PATENT DOCUMENTS

| AT | 609 196 B1 | 7/2011 |
| CN | 1950636 A | 4/2007 |

(Continued)

OTHER PUBLICATIONS

International Search Report of PCT/EP2016/073540, dated Jan. 2, 2017.

(Continued)

*Primary Examiner* — Zachary T Dragicevich
(74) *Attorney, Agent, or Firm* — Collard & Roe, P.C.

(57) ABSTRACT

A connector has a connector body, which connector body includes an annular space which lies between a sleeve-like first casing section and a sleeve-like second casing section of the connector. The first casing section of the connector body is connected to the second casing section at a first end section by a first end wall section. The casing sections are open to one another at a second end section. In the first casing section and in the second casing section at least two passages are formed which are provided for mounting a locking element. In the connector body between the first casing section and the second casing section a reinforcing element is inserted, wherein the reinforcing element is arranged at least in the area of one of the passages.

11 Claims, 6 Drawing Sheets

(58) Field of Classification Search
USPC .......................................................... 285/321
See application file for complete search history.

(56) References Cited

U.S. PATENT DOCUMENTS

| | | | |
|---|---|---|---|
| 5,855,399 A * | 1/1999 | Profunser | F16L 37/088 |
| | | | 285/321 |
| 7,597,362 B2 | 10/2009 | Hartmann | |
| 7,614,665 B2 | 11/2009 | Hartmann | |
| 8,997,328 B2 | 4/2015 | Hartmann et al. | |
| 9,657,878 B2 | 5/2017 | Hartmann | |
| 2008/0191471 A1 | 8/2008 | Hartmann | |
| 2008/0191481 A1* | 8/2008 | Hartmann | F16L 37/0885 |
| 2008/0315576 A1 | 12/2008 | Moretti et al. | |
| 2013/0000939 A1 | 1/2013 | Jonsson | |
| 2017/0074444 A1 | 3/2017 | Nezu | |

FOREIGN PATENT DOCUMENTS

| | | |
|---|---|---|
| DE | 10 2008 027204 A1 | 12/2009 |
| EP | 2 360 411 A1 | 8/2011 |
| JP | H04-52691 U | 5/1992 |
| JP | H05-83573 U | 11/1993 |
| JP | 2005-188682 A | 7/2005 |
| JP | 2007-508506 A | 4/2007 |
| JP | 2007-533928 A | 11/2007 |
| RU | 2 395 747 C1 | 7/2010 |
| WO | 2005/045299 A1 | 5/2005 |
| WO | 2005/103550 A1 | 11/2005 |
| WO | 2005/103551 A1 | 11/2005 |
| WO | 2009/094679 A1 | 8/2009 |
| WO | 2011/106805 A1 | 9/2011 |
| WO | 2013/166536 A1 | 11/2013 |
| WO | 2015/141557 A1 | 9/2015 |

OTHER PUBLICATIONS

International Search Report of PCT/EP2016/073541, dated Jan. 2, 2017.
Japanese Search Report dated Jun. 30, 2020 in Japanese Application No. 2018-518461 with English translation.
Notice of Reasons of Refusal dated Jul. 7, 2020 in Japanese Application No. 2018-518461 with English translation.

* cited by examiner

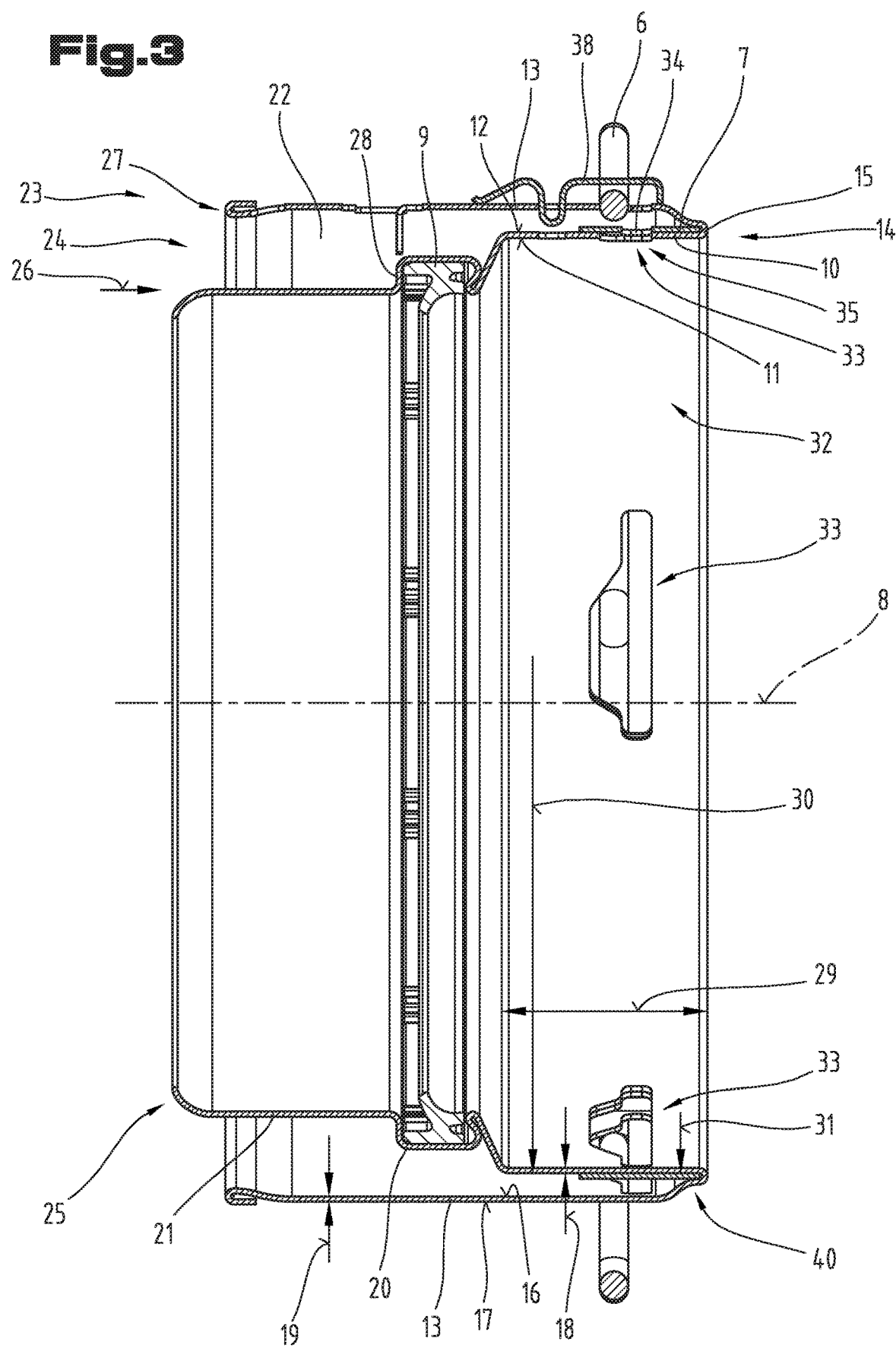

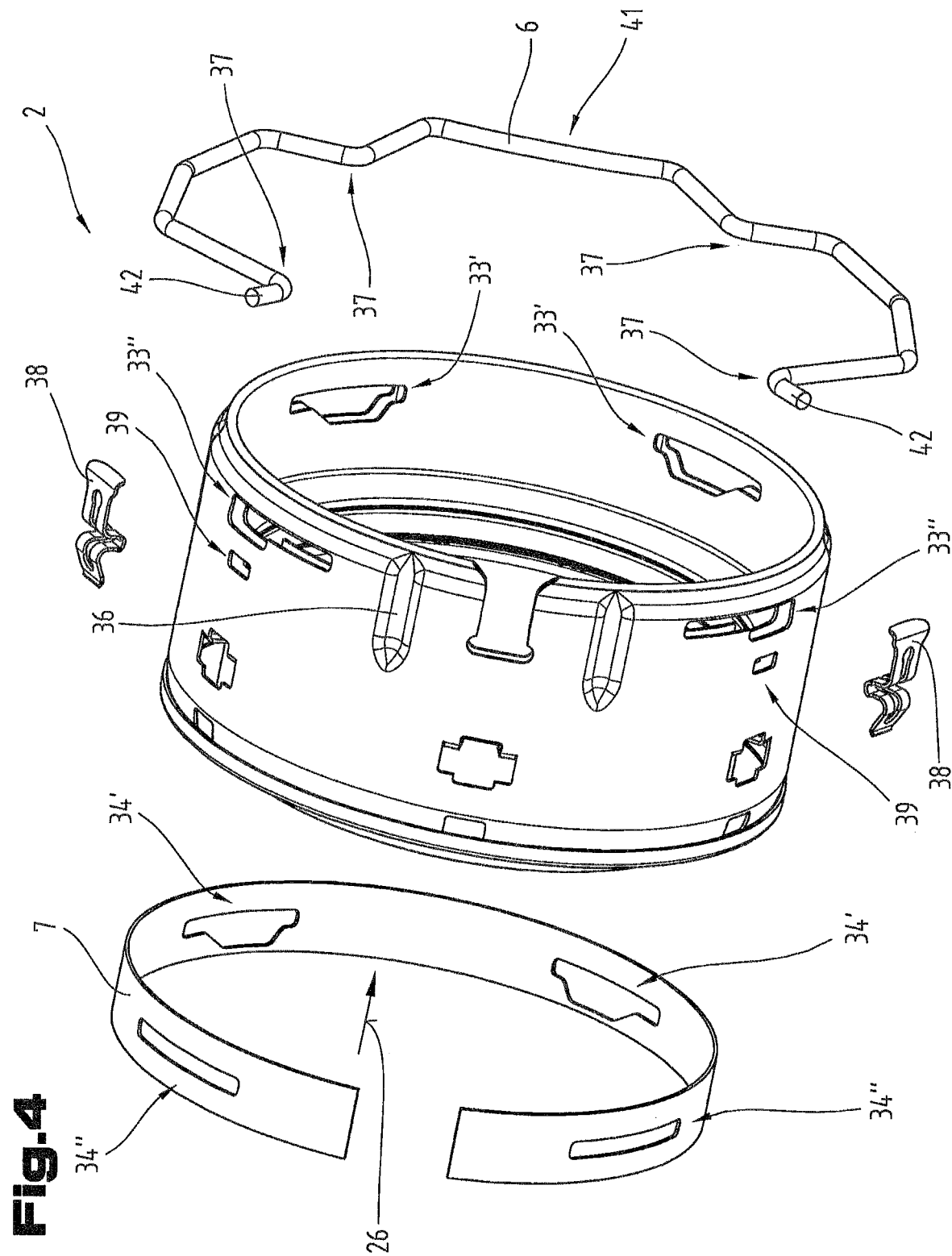

CONNECTOR FOR CONNECTING CONDUITS FOR LIQUID OR GASEOUS MEDIA

CROSS REFERENCE TO RELATED APPLICATIONS

This application is the National Stage of PCT/EP2016/073540 filed on Oct. 3, 2016, which claims priority under 35 U.S.C. § 119 of Austrian Application No. A 50855/2015 filed on Oct. 7, 2015, the disclosure of which is incorporated by reference. The international application under PCT article 21(2) was not published in English.

BACKGROUND OF THE INVENTION

1. Field of the Invention

The invention relates to a connector for connecting conduits for liquid or gaseous media and to a method for producing such a connector.

2. Description of the Related Art

From EP 2 360 411 A1 a generic connector is known for a motor vehicle. The connector for connecting conduits for liquid or gaseous media comprises a sleeve which has an insertion opening. A connecting piece can be inserted into the insertion opening. Furthermore, the connector comprises a locking spring surrounding the sleeve at least over a portion of its circumference, which locking spring can be adjusted between a locking position for locking the connecting piece fitted to the connector and a release position that is locked relative to the sleeve, in which the locking connection with the connecting piece is released and the connecting piece can be removed from the insertion opening of the sleeve. The locking spring projects at least in its locking position over at least a portion of its longitudinal extension in which it can be locked to the connecting piece through a passage of the sleeve into the inner space surrounding the sleeve. Furthermore, wherein the locking spring is locked in place in its locked release position in at least one locking position of the locking spring behind a holding projection of the sleeve in a holding recess of the sleeve. The holding projection projects relative to the holding recess in the axial direction of the sleeve.

The connector of EP 2 360 411 A1 can easily be damaged by the application of force in the area of the locking spring.

SUMMARY OF THE INVENTION

The objective of the present invention was to overcome the disadvantages of the prior art and provide a device in which the components are much less likely to break, and provide a method for producing such a device.

Said objective is achieved by a device and a method according to the invention.

The device according to the invention is a connector for a motor vehicle, comprising a connector body, which connector body comprises an annular space, which lies between a sleeve-like first casing section in cross-section surrounding a central longitudinal axis of the connector and a sleeve-like second casing section of the connector in cross-section surrounding the central longitudinal axis. The first casing section is surrounded by the second casing section and the first casing section of the connector body is connected to the second casing section at a first end section by a first end wall section. The casing sections are open to one another at a second end section. In the first casing section and in the second casing section at least two passages are formed, which are provided for receiving a locking element, which locking element is provided for securing the connector relative to a counter connector. In the connector body a reinforcing element is inserted between the first casing section and the second casing section, wherein the reinforcing element is arranged at least in the area of one of the passages.

An advantage of the design of the connector according to the invention is that the connector body is reinforced by the reinforcing element particularly in the area of the passages for receiving the locking element. Thus by means of the reinforcing element the unwanted widening of the passages can be prevented. In particular, it can be ensured in this way that the connection between the connector and counter connector has the greatest degree of strength and highest sealing effect over the lifetime of the motor vehicle.

Furthermore, it can be advantageous if the reinforcing element has a at least one recess which corresponds at least partly with one of the passages. It is an advantage here that the recess of the reinforcing element can reinforce the passage in the connector body.

Furthermore, it is possible for the connector body to comprise four passages which are designed to be passed through by the locking element, wherein the at least one recess of the reinforcing element is congruent with at least one of the passages and in this way a joint passage is formed. It is an advantage here that the joint passage can be produced in a punching process, wherein the reinforcing element and the connector body are punched jointly. It is thus ensured that the recess in the reinforcing element and the passage in the connector body are congruent. Furthermore, by means of the joint punching process it is possible that the reinforcing element and the connector body fit into one another in a wedge-like manner, as during the punching process a cutting burr is produced.

Furthermore, it is possible that the at least one recess of the reinforcing element is designed to be smaller than the corresponding passage. It is an advantage here that in this way a support area can be created and the locking element can bear on said support area in the release position.

A design is also advantageous in which the reinforcing element is designed as a sleeve segment. It is an advantage here that the reinforcing element can be punched out of a metal strip and can be shaped into a sleeve segment. A sleeve segment is defined as a sleeve which is not circumferential but which only extends over portions of the circumference. As an alternative to a sleeve segment it is also possible to use a closed sleeve.

According to one development it is possible that an outer diameter of the first casing section is the same size as an inner diameter of the reinforcing element. It is an advantage here that the reinforcing element bears on the first casing section and can thus reinforce the latter.

Furthermore, it can be advantageous that a beading is formed in the second casing section, by means of which the reinforcing element is fixed in radial direction. By means of the beading the reinforcing element can be clamped between the first casing section and second casing section.

Furthermore, it is possible for the connector body to be made from a first material and the reinforcing element to be made from a second material, wherein the second material is stronger than the first material. It is an advantage here that a material can be used for the reinforcing element which has high strength and which if necessary does not change its shape easily. For the connector body a material can be used which has a high degree of formability in order to create the complex geometry of the connector body.

In the method for producing the connector in a first method step the connector body is shaped and optionally the passages are formed in the connector body; in a further method step a reinforcing element is pre-formed; in a further method step the reinforcing element is pushed axially into the connector body and is positioned in the connector body. An advantage of the method according to the invention is that the reinforcing element can be preformed in a separate method step and thus the reinforcing element can be shaped independently of the connector body.

Furthermore, according to a further method step the connector body and the reinforcing element are punched jointly and a joint passage is formed thereby. It is thus ensured that the recess in the reinforcing element and the passage in the connector body are congruent. Furthermore, by means of the joint punching process it is possible that the reinforcing element and the connector body fit into one another in a wedge-like manner, as during the punching process a cutting burr is produced.

BRIEF DESCRIPTION OF THE DRAWINGS

For a better understanding of the invention the latter is explained in more detail with reference to the following Figures.

In a much simplified, schematic representation:

FIG. 3 is a cross-sectional view of the connector with a cross-section along a central longitudinal axis of the connector;

FIG. 4 is an exploded view of the connector;

DETAILED DESCRIPTION OF THE PREFERRED EMBODIMENTS

Figure 1:
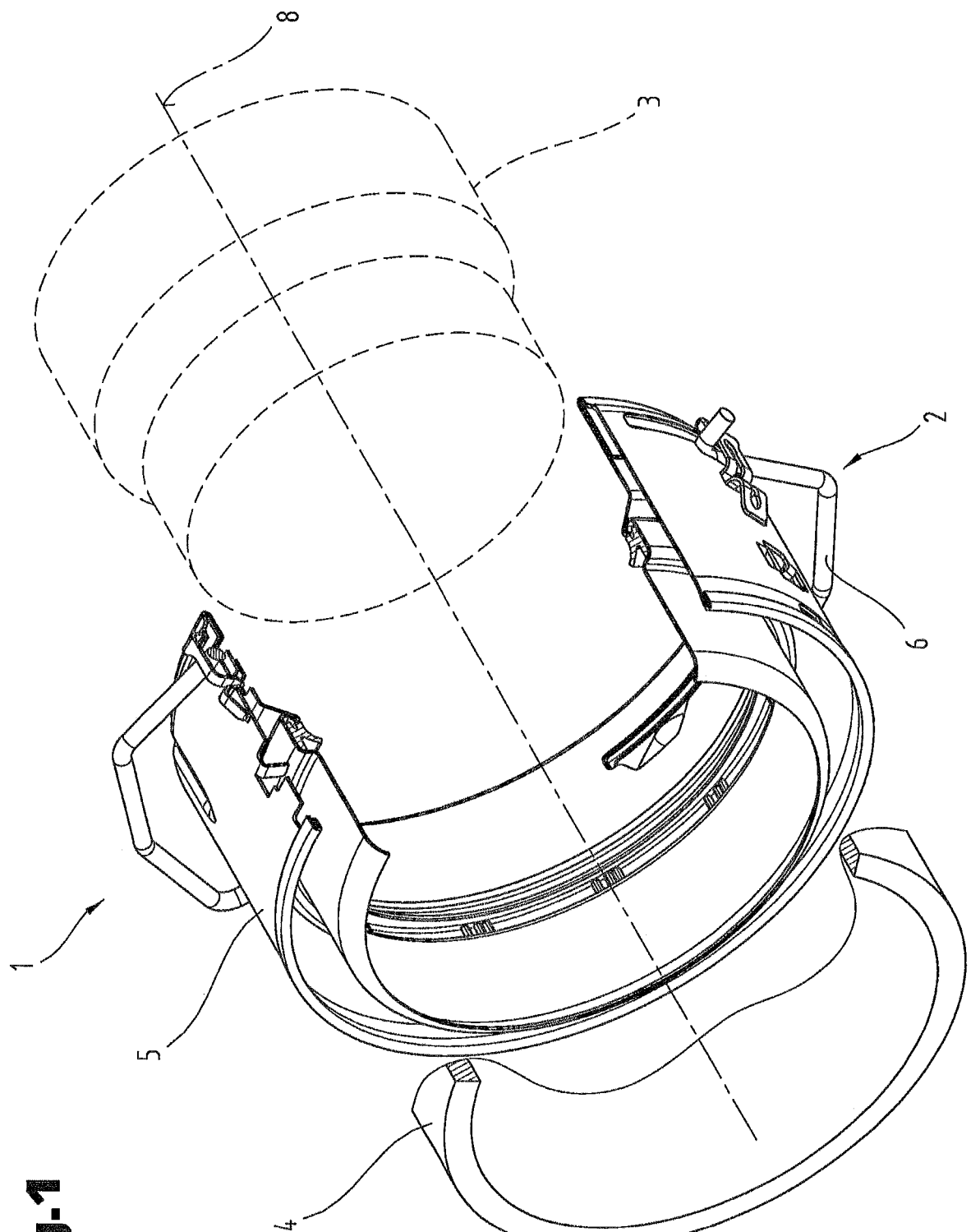
FIG. 1 is a perspective representation of an embodiment variant of a connector assembly in a quarter section.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a perspective view of a connector assembly 1 with a connector 2, wherein the latter is shown in a quarter section. Furthermore, FIG. 1 shows schematically a counter connector 3, which can be connected with the connector assembly 1. The interconnection between the connector assembly 1 and a counter connector 3 is described in detail in AT 509 196 B1.

Furthermore, a pipe 4 is shown schematically to which the connector 2 can be coupled. The pipe 4 can for example be rigid, such as plastic pipe. In another embodiment variant the pipe 4 can be made as a flexible conduit from a rubber material.

The connector 2 comprises a connector body 5, which is preferably designed as a one-piece molded part, such as a deep-drawn part, in particular made of stainless steel plate.

The connector assembly 1 is preferably used in a motor vehicle, in particular in a road vehicle with a combustion engine, such as a car or a lorry.

Of course, it is also possible for the connector assembly 1 to be used differently with a combustion engine. This can include for example the use of the connector assembly 1 in a stationary assembly, a ship's engine, an aircraft engine, a construction machine etc.

In particular, the connector assembly 1 can be used for connecting different components of the fresh air supply to the combustion engine. For example, it is possible that the connector 2 is provided with the corresponding counter connector 3 for connecting two parts in the suction area of a turbocharger. Furthermore, it also possible for example to insert such a connector assembly 1 in the pressure side coming from the turbocharger for connecting two components.

Figure 2:
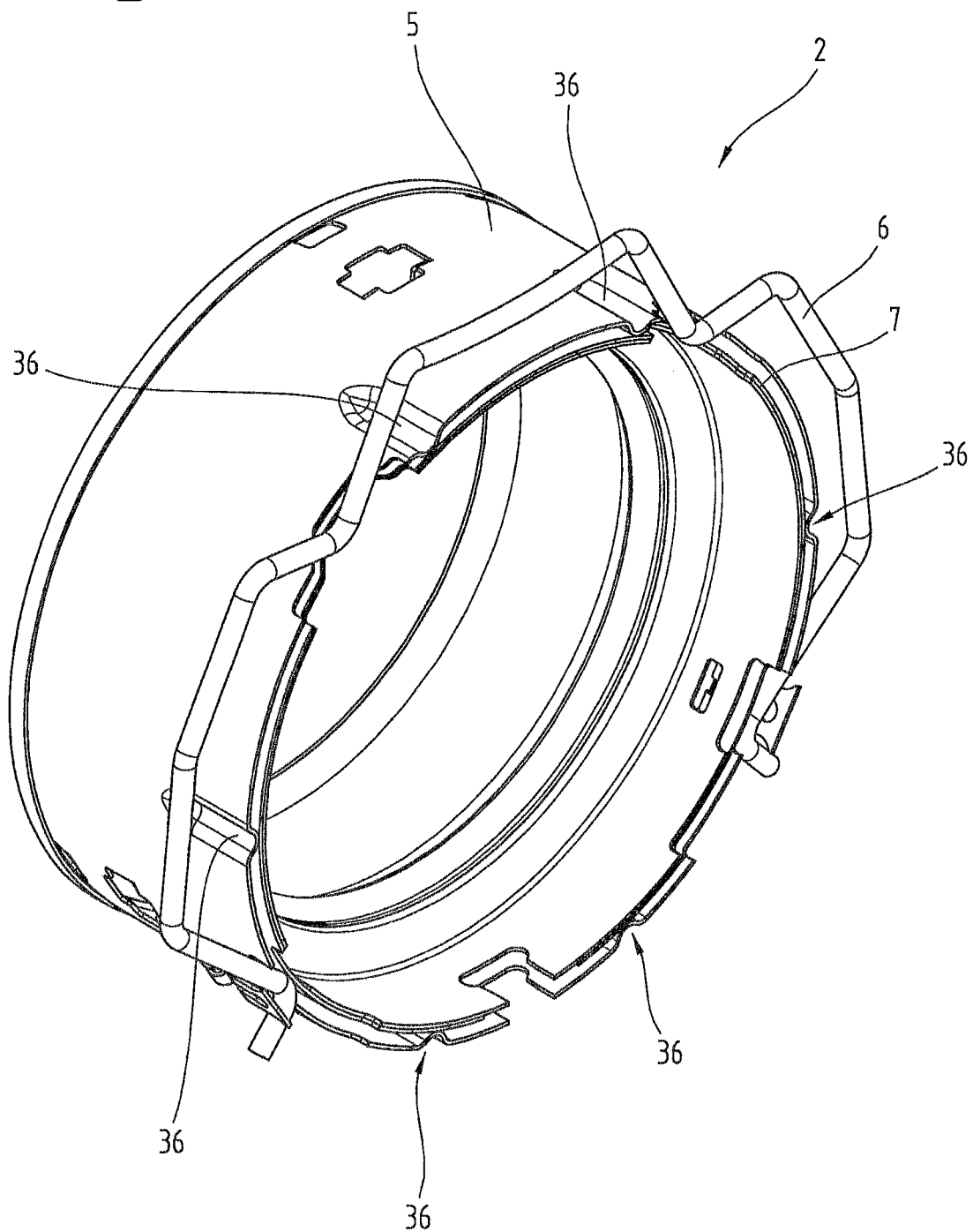
FIG. 2 is a cross-section of an embodiment of the connector with a cross-section in the area of a locking element.

FIG. 2 shows a cross-section of the connector 2, wherein the cross-sectional line is selected so that a locking element 6 installed in the connector 2 for securing the connector 2 and the counter connector 3 to one another is shown.

The locking element 6 is constructed so that it can be activated and deactivated easily, so that the connector 2 and the counter connector 3 can be separated from one another or connected to one another as necessary. The locking element 6 can be moved into a locked position, in which the connector 2 and the counter connector 3 are secured to one another. Furthermore, the locking element 6 can be moved into a release position, in which the counter connector 3 can be inserted into the connector 2 or can be removed from the latter.

As also shown in FIG. 2, a reinforcing element 7 is inserted into the connector body 5 which reinforcing element is used for improving the rigidity of the connector body 5. The reinforcing element 7 can be designed as a sleeve segment, as shown clearly in FIG. 2, and can therefore comprise an intermediate piece which has an open circumference. In a further embodiment variant the reinforcing element 7 can be designed as a sleeve and can therefore have a closed circumference.

FIG. 3 shows a cross-section of the connector assembly 1 along a central longitudinal axis 8 of the connector 2.

As shown clearly in FIG. 3, the connector 2 can comprise a connector seal 9 next to the connector body 5, which seal is mounted in the connector body 5. The connector seal 9 is used to seal the connector sufficiently in the plugged-in state with the counter connector 3.

As shown in FIG. 3, on the connector body 5 a first casing section 10 is formed which surrounds the central longitudinal axis 8 of the connector 2 in a sleeve-like manner. In other words, the first casing section 10 is a rotationally-symmetrical hollow cylinder.

The first casing section 10 comprises an inner casing surface 11 and an outer casing surface 12. A second casing section 13 surrounds the first casing section 10, which second casing section is also designed to be rotationally symmetrical relative to the central longitudinal axis 8. The first casing section 10 is connected to the second casing section 13 at a first end section 14 by means of a first end wall section 15. The first end wall section 15 can be designed differently. In particular, the first end wall section 15 can be designed in the form of a fold, the second casing section 13 being folded by about 180° relative to the first casing section 10, whereby the second casing section 13 is arranged surrounding the first casing section 10.

As with the first casing section 10 the second casing section 13 also comprises an inner casing surface 16 and an outer casing surface 17.

The first casing section 10 is delimited by its inner casing surface 11 and the outer casing surface 12, thereby forming a wall thickness 18 of the first casing section 10. The second casing section 13 is also delimited by an inner casing surface 16 and an outer casing surface 17, thereby forming the wall thickness 19 of the second casing section 13.

The first casing section 10 is designed to be stepped in the shown embodiment. It is possible that a seal mount 20 adjoins the first casing section 10 on the opposite side of the first end section 14 of the connector 2, which seal mount 20 is also formed in the connector body 5. A connector seal 9 can be mounted in such a seal mount 20. Furthermore, it is also possible that a third casing section 21 adjoins the seal mount 20, which casing section together with the second casing section 13 forms an annular space 22 for receiving the pipe 4.

The second casing section 13 and the third casing section 21 are open to one another at a second end section 23 of the connector 2, thereby forming a pipe receiving side 24 of the connector body 5.

It is possible for the third casing section 21 in the area of the second end section 23 to have a beveling 25 which is formed on the pipe receiving side 24. Such a beveling 25 has the advantage that the pipe 4 or a sealing element used for sealing the pipe 4 can be inserted easily in insertion direction 26 into the annular space 22. Furthermore, it is also possible for the second casing section 13 to have such a beveling 27 so that the pipe 4 can also be pushed easily into the annular space 22. Afterwards, the pipe 4 can be pressed together with the connector body 5 so that the two components form a single unit.

The beveling 25, 27 can be formed for example by beading having corresponding radii or by widenings and are preferably formed during the deep-drawing process.

Preferably, the connector body 5 is produced by means of a deep-drawing process, wherein all of the wall thicknesses of the casing sections of the connector body 5 are about the same size.

As shown in the view of FIG. 3, it can also be advantageous for the seal mount 20 to have an end face wall 28 which adjoins the third casing section 21. By means of the end face wall 28 in particular a mounting recess can be formed for the connector seal 9.

The first casing section 10 has an outer diameter 30 and an axial extension 29. An inner diameter 31 of the reinforcing element 7 is preferably approximately the same size as the outer diameter 30 of the first casing section 10.

In the area of the first casing section 10 the connector 2 has a receiving space 32. The receiving space 32 is surrounded by the first casing section 10 and is used for receiving a portion of the counter connector 3.

The connector body 5 comprises a plurality of passages 33 which are spaced apart from one another in circumferential direction which are also arranged in the area of the first casing section 10. In the locking position of the locking element 6, which the latter adopts in the inserted and locked state, the locking element 6 projects through the respective passage 33 into the receiving chamber 32. In said sections the locking element 6 interacts with a locking surface of a locking shoulder of the counter connector 3.

It is also shown in FIG. 3 that the reinforcing element 7 comprises a recess 34 which corresponds with one of the passages 33 and thus the locking element 6 can be guided through the reinforcing element 7. In particular, it is possible for a first type of passage 33' and a second type of passage 33" to be formed. Corresponding with the latter a first type of recess 34' and a second type of recess 34" are formed.

In particular, the recess 34" of the reinforcing element 7 and the passage 33" of the connector body 5 have at least partly the same outer contour and are arranged to be congruent with one another.

In particular the passage 33' and the recess 34' can be designed to be fully congruent, thereby forming a joint passage 35.

As shown in an overview of FIGS. 2 and 3, it is also possible that in the second casing section 13 of the connector body 5 one or more beadings 36 are inserted, by means of which the reinforcing element 7 can be clamped into the intermediate space between the first casing section 10 and second casing section 13. By means of the beadings 36 the reinforcing element 7 can be fixed in radial direction or can be held in position by radial clamping in axial direction if necessary. The beadings 36 can also be used to increase the stability of the second casing section 13.

FIG. 4 shows an exploded view of the individual components of the connector 2, wherein the same reference numerals and component names are used for the same parts as in the preceding FIGS. 1 to 3. To avoid unnecessary repetition, reference is made to the detailed description of the preceding FIGS. 1 to 3.

It is shown clearly in FIG. 4 that the locking element 6 can comprise four locking areas 37 for example, which are designed to pass through the passages 33 of the connector body 5. The locking areas 37 are therefore designed as inwardly pointing V-shaped elements. As also shown in FIG. 4, the connector 2 also comprises holding elements 38, which are inserted into a holding element mount 39 and are used for securing the locking element 6.

The reinforcing element 7 is shown as already prefabricated in FIG. 4, where it is prebent and the recesses 34 have already been formed in the reinforcing element 7. In particular, as shown, the reinforcing element 7 can be designed as a sleeve segment. Furthermore it is shown for example that the two recesses 34" can be designed to be slit-like. The two recesses 34' can have exactly the same outer contour as the corresponding passages 33'.

In a further not shown embodiment variant it is also possible that the recesses 34 are not made or are only partly formed in the prefabricated reinforcing element 7 and that the latter are only formed when the reinforcing element 7 is inserted into the connector body 5. Here the reinforcing element 7 can be punched in the inserted state together with the connector body 5.

In order to reinforce the connector body 5 with the reinforcing element 7, the reinforcing element 7 can have a higher strength than the connector body 5. As the reinforcing element 7 does not need to be shaped as much as the connector body 5, the connector body 5 can be made from a first material and the reinforcing element 7 can be made from a second material, wherein the second material is less deformable than the first material.

In the following the possible method of assembly of the connector 2 is described. In a first method step the connector body 5 is produced by shaping, in particular by deep-drawing, from a flat sheet metal material. Here during the deep-drawing process the recesses 34 and 39 formed in the circumference of the connector body 5 can be punched out.

In a further method step the reinforcing element 7 can also be shaped by forming.

Furthermore, it is possible that at least one of the passages 33 and the corresponding recess 34 are only produced in a following punching process when the reinforcing element 7 is already placed into the connector body 5. In this way the recess 34 and the passage 33 can be produced in the form of a joint passage 35, wherein by means of the punching process the reinforcing element 7 and the connector body 5 can fit into one another in a wedge-like manner and in this way the axial positioning of the reinforcing element 7 is improved.

In an alternative variant it is possible that the recesses 34 are inserted into the reinforcing element 7 before placing into the connector body 5.

In a further method step the reinforcing element 7 can be pushed into the connector body 5 in insertion direction 26 and inserted into the latter. It is possible in this case that the reinforcing element 7 is inserted into a fold area 40 which is formed in the connector body 5 in the area of the end wall section 15. By means of this fold area 40 a narrow slit can be formed radially into which the reinforcing element 7 can be inserted. In particular, it is possible for the reinforcing element 7 to be clamped in the fold area 40.

In addition, beadings 36 are used for the axial and radial positioning and for fixing the reinforcing element 7. The latter can be inserted in advance into the connector body 5. In an alternative method of production the beadings 36 can also be inserted after inserting the reinforcing element 7 into the connector body 5 in order to clamp the reinforcing element 7.

In a further method step the locking element 6 can be inserted into the connector body 5 and afterwards the holding elements 38 can be used for securing the locking element 6 into the connector body 5.

The locking element 6 comprises a holding area 41 which can be gripped in order to be inserted into the connector body 5 and moved between a locked position and a release position.

Figure 5:
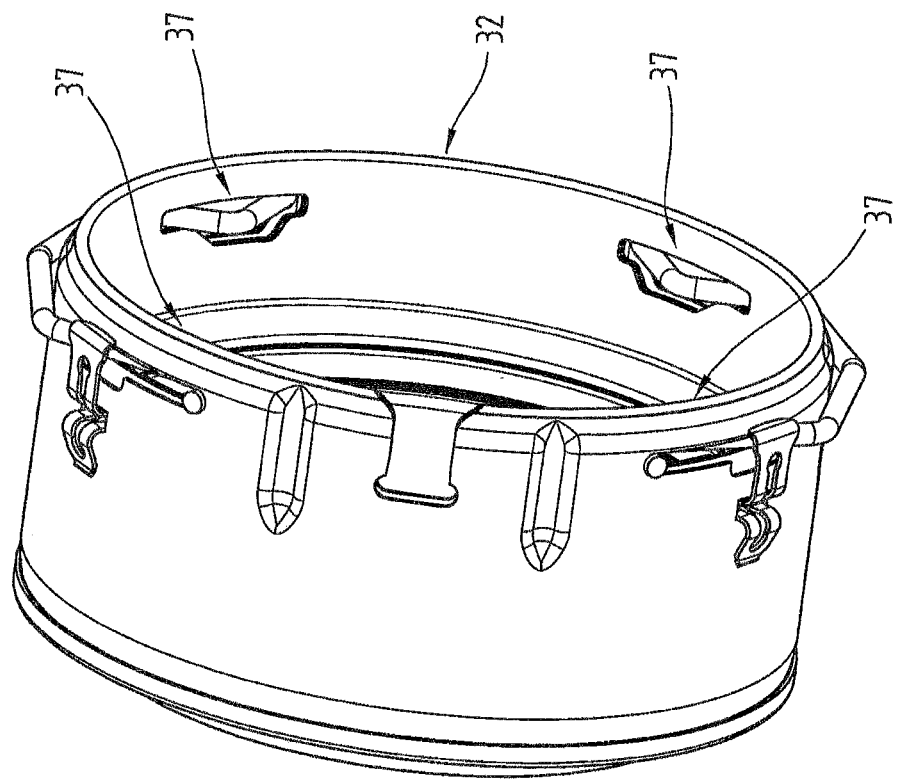
FIG. 5 is a perspective view of the connector, wherein the locking element is in a locked position.

FIG. 5 shows a perspective view of the connector 2, where the locking element 6 is in the locked position.

Figure 6:
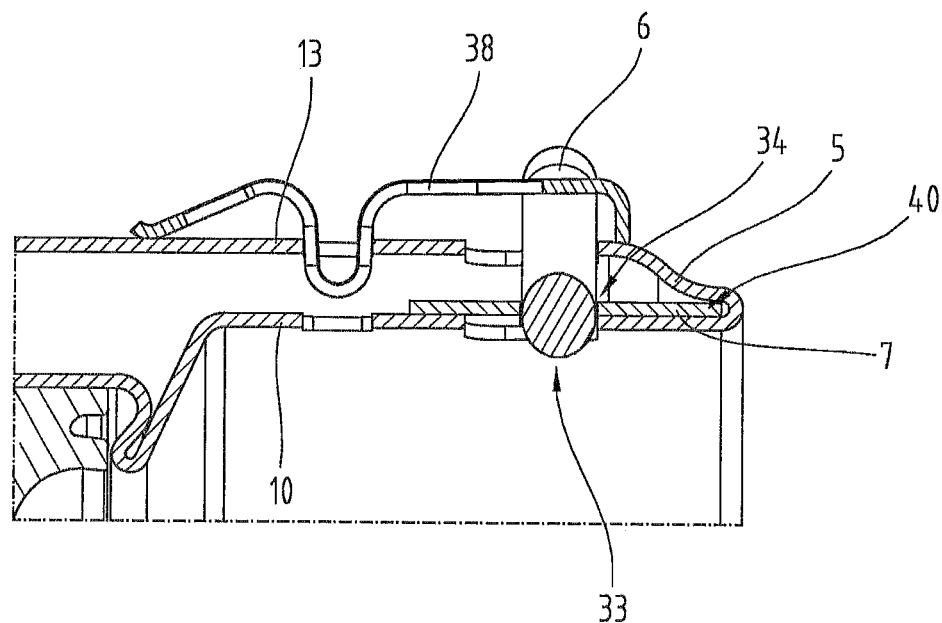
FIG. 6 is a detailed view of the locking element, wherein the locking element is in a locked position.

FIG. 6 shows a detailed view of the locking element 6 which is in the locked position.

Figure 7:
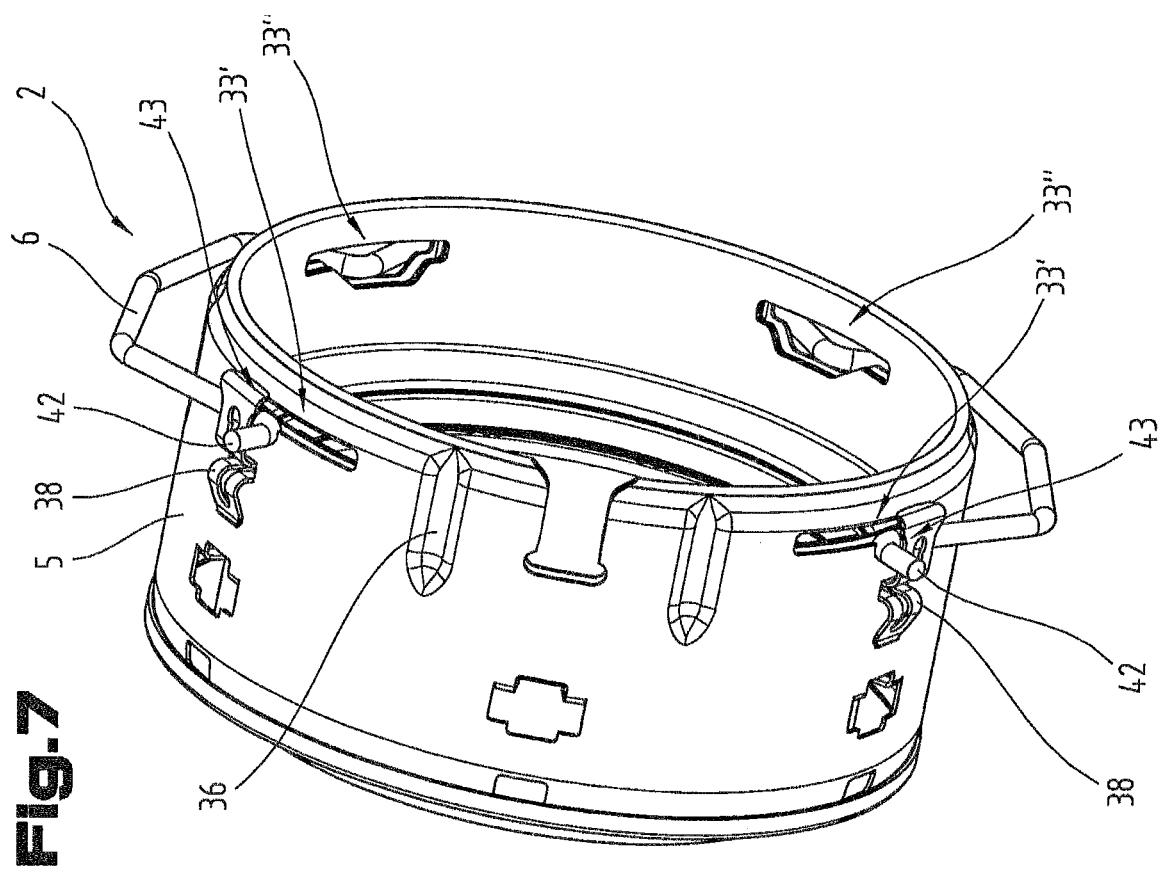
FIG. 7 is a detailed perspective view of the connector, wherein the locking element is in a release position.

FIG. 7 shows a perspective view of the connector 2, where the locking element 6 is in the release position.

Figure 8:
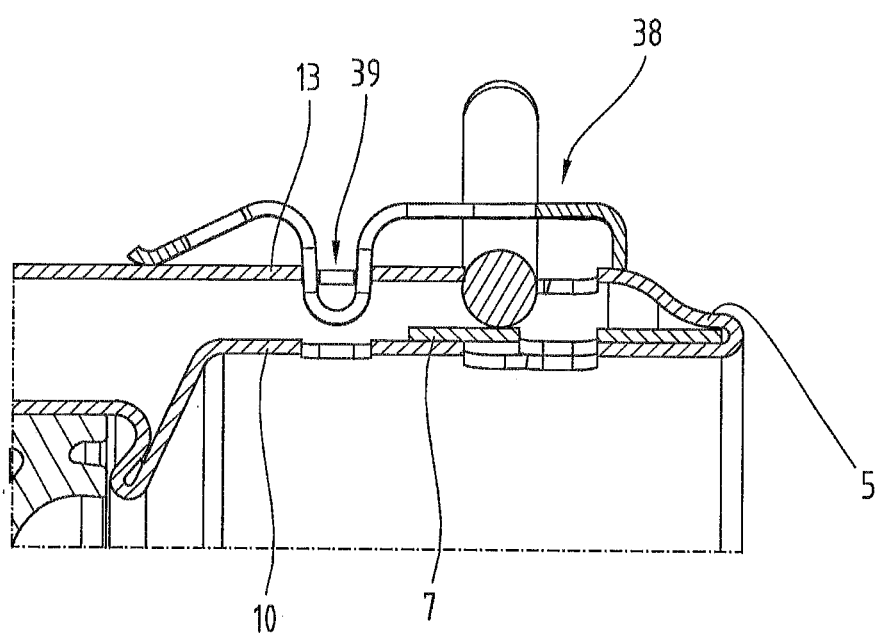
FIG. 8 is a detailed view of the locking element, wherein the locking element is in a release position.

FIG. 8 shows a detailed view of the locking element 6 which is in the release position.

FIGS. 5 to 8 show a further and possibly independent embodiment of the connector 2, wherein the same parts and component names are used for the same parts as in the preceding FIGS. 1 to 4. To avoid unnecessary repetition reference is made to the detailed description of the preceding FIGS. 1 to 4.

The locking position of the locking element 6 is shown particularly clearly in an overview of FIGS. 5 and 6, and the release position of the locking element 6 is shown in an overview of FIGS. 7 and 8. When the locking element 6 is in its locking position the locking areas 37 project into the receiving space 32 and the counter connector 3 is secured axially relative to the connector 2. When the locking element 6 is in its release position the locking areas 37 do not project into the receiving space 32 and the counter connector 3 can be displaced axially relative to the connector 2.

As shown in FIG. 6 the recess 34 can be designed to be slit-like in the reinforcing element 7, where the slit has a width which corresponds approximately to the diameter of the locking element 6. In this way the locking element 6 can be fixed axially.

If the locking element 6 at the holding area 41 is drawn in radial direction away from the longitudinal axis of the connector 2, due to the geometry of the locking element 6 the locking areas 37 are removed from the receiving space 32. In particular, the locking element 6 is moved so far radially outwards until it is moved into the release position according to FIGS. 7 and 8.

Shortly before reaching the release position a guide pin 42 of the locking element 6 contacts the holding element 38 and is axially deflected by the latter so that the locking element 6 moves into the release position. In particular, it is possible for a beveling 43 to be formed in the holding element 38, by means of which with radial tension on the holding area 41 an axial movement is introduced to the locking element 6. After the completion of the axial displacement the locking element 6 can be released, whereby the guide pin 42 bears on the connector body 5 or, as shown particularly clearly in FIG. 8, bears on the reinforcing element 7 and thus remains in the release position in which the locking element 6 is pretensioned.

In order to move the locking element 6 out of the release position back into the locking position, the locking element 6 can be displaced slightly axially and from the prestressing of the locking element 6 the latter moves automatically back into the locked position, as soon as it can enter into the recesses 34' of the locking element 6.

The exemplary embodiments show possible embodiment variants, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

The scope of protection is defined in the claims. To interpret the claims the description and the drawings should be referred to. Individual features or combinations of features from the various different shown and described embodiments can represent independent solutions of the invention. The problem addressed by the independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Finally, as a point of formality, it should be noted that for a better understanding of the structure some elements have not been represented true to scale in part and/or have been enlarged and/or reduced in size.

| List of reference numerals | |
| --- | --- |
| 1 | connector assembly |
| 2 | connector |
| 3 | counter connector |
| 4 | pipe |
| 5 | connector body |
| 6 | locking element |
| 7 | reinforcing element |
| 8 | longitudinal axis of the connector |

-continued

| List of reference numerals | |
|---|---|
| 9 | connector seal |
| 10 | first casing section |
| 11 | inner casing surface |
| 12 | outer casing surface |
| 13 | second casing section |
| 14 | first end section connector |
| 15 | end wall section |
| 16 | inner casing surface |
| 17 | outer casing surface |
| 18 | wall thickness of first casing section |
| 19 | wall thickness of second casing section |
| 20 | seal mount of connector |
| 21 | third casing section |
| 22 | annular space |
| 23 | second end section of connector |
| 24 | pipe receiving side |
| 25 | beveling |
| 26 | insertion direction |
| 27 | beveling |
| 28 | end wall of seal mount |
| 29 | axial extension of first casing section |
| 30 | outer diameter of first casing section |
| 31 | inner diameter |
| 32 | receiving space |
| 33 | passage |
| 34 | recess |
| 35 | joint passage |
| 36 | beading |
| 37 | locking area |
| 38 | holding element |
| 39 | holding element mount |
| 40 | fold area |
| 41 | holding area |
| 42 | guide pin |
| 43 | beveling |

The invention claimed is:

1. A connector for connecting conduits for liquid or gaseous media, comprising
a connector body, which connector body comprises an annular space which lies between a sleeve-shaped first casing section in cross-section surrounding a central longitudinal axis of the connector and a sleeve-shaped second casing section of the connector in cross-section surrounding the central longitudinal axis,
wherein the first casing section is surrounded by the second casing section and the first casing section of the connector body is connected to the second casing section at a first end section by a first end wall section and the casing sections are open to one another at a second end section,
wherein in the first casing section and in the second casing section at least two passages are formed, which are provided for receiving a locking element, which locking element is provided for securing the connector relative to a counter connector,
wherein in the connector body a reinforcing element is inserted between the first casing section and the second casing section,
wherein the reinforcing element comprises at least one recess which corresponds at least partly with one of the passages, and
wherein an outer diameter of the first casing section is the same size as an inner diameter of the reinforcing element.

2. The connector as claimed in claim 1, wherein the reinforcing element is arranged at least in the area of one of the passages.

3. The connector as claimed in claim 1,
wherein the connector body comprises four passages which are designed to be passed through by the locking element, and
wherein the at least one recess of the reinforcing element is congruent with at least one of the passages and in this way a joint passage is formed.

4. The connector as claimed in claim 1, wherein the at least one recess of the reinforcing element comprises a plurality of recesses, wherein one recess of the plurality of recesses is designed to be smaller than the corresponding passage.

5. The connector as claimed in claim 1, wherein the reinforcing element is designed as a sleeve segment.

6. The connector as claimed in claim 1, wherein in the second casing section at least one beading is formed, by means of which the reinforcing element is fixed in radial direction.

7. The connector as claimed in claim 1,
wherein the connector body is made from a first material and the reinforcing element is made from a second material, and
wherein the second material has greater strength than the first material.

8. A method for producing the connector as claimed in claim 1, wherein
in a first method step the connector body is shaped and optionally the passages are formed in the connector body;
in a further method step a reinforcing element is pre-formed;
in a further method step the reinforcing element is pushed axially into the connector body and is positioned in the connector body; and
in a further method step the connector body and the reinforcing element are punched jointly and in this way a joint passage is produced.

9. A connector for connecting conduits for liquid or gaseous media, comprising
a connector body, which connector body comprises an annular space which lies between a sleeve-shaped first casing section in cross-section surrounding a central longitudinal axis of the connector and a sleeve-shaped second casing section of the connector in cross-section surrounding the central longitudinal axis,
wherein the first casing section is surrounded by the second casing section and the first casing section of the connector body is connected to the second casing section at a first end section by a first end wall section and the casing sections are open to one another at a second end section,
wherein in the first casing section and in the second casing section at least two passages are formed, which are provided for receiving a locking element, which locking element is provided for securing the connector relative to a counter connector,
wherein in the connector body a reinforcing element is inserted between the first casing section and the second casing section,
wherein the reinforcing element comprises at least one recess which corresponds at least partly with one of the passages, and
wherein in the second casing section at least one beading is formed, by means of which the reinforcing element is fixed in radial direction.

10. A connector for connecting conduits for liquid or gaseous media, comprising a connector body, which connector body comprises an annular space which lies between a sleeve-shaped first casing section in cross-section surrounding a central longitudinal axis of the connector and a sleeve-shaped second casing section of the connector in cross-section surrounding the central longitudinal axis, wherein the first casing section is surrounded by the second casing section and the first casing section of the connector body is connected to the second casing section at a first end section by a first end wall section and the casing sections are open to one another at a second end section, wherein in the first casing section and in the second casing section at least two passages are formed, which are provided for receiving a locking element, which locking element is provided for securing the connector relative to a counter connector, wherein in the connector body a reinforcing element is inserted between the first casing section and the second casing section, wherein the reinforcing element comprises at least one recess which corresponds at least partly with one of the passages, wherein the passages are designed to be passed through by the locking element, and wherein the at least one recess of the reinforcing element is congruent with at least one of the passages and in this way a joint passage is formed.

11. A connector for connecting conduits for liquid or gaseous media, comprising a connector body, which connector body comprises an annular space which lies between a sleeve-shaped first casing section in cross-section surrounding a central longitudinal axis of the connector and a sleeve-shaped second casing section of the connector in cross-section surrounding the central longitudinal axis, wherein the first casing section is surrounded by the second casing section and the first casing section of the connector body is connected to the second casing section at a first end section by a first end wall section and the casing sections are open to one another at a second end section, wherein in the first casing section and in the second casing section at least two passages are formed, which are provided for receiving a locking element, which locking element is provided for securing the connector relative to a counter connector, wherein in the connector body a reinforcing element is inserted between the first casing section and the second casing section, wherein the reinforcing element comprises at least one recess which corresponds at least partly with one of the passages, and wherein the recess of the reinforcing element is axially distanced from a first axial end face of the reinforcing element.

* * * * *